United States Patent [19]
Benenti et al.

[11] Patent Number: 5,640,197
[45] Date of Patent: Jun. 17, 1997

[54] PERIPHERAL UNIT FOR SATELITE MULTI-VIDEOCONFERENCING

[75] Inventors: Claudio Benenti, La Loggia; Antonio Cavallaro, Mathi; Paolo Destefanis; Piero Lovisolo, both of Turin, all of Italy

[73] Assignee: Sip Societa Italiana Per L'Esercizio Delle Telecomunicazioni p.A., Turin, Italy

[21] Appl. No.: 404,953

[22] Filed: Mar. 16, 1995

[30] Foreign Application Priority Data

Apr. 13, 1994 [IT] Italy .................. TO94A0282

[51] Int. Cl.⁶ .................. H04M 11/00
[52] U.S. Cl. .................. 348/15; 379/202; 455/3.2
[58] Field of Search .................. 348/15–19; 379/93, 379/94, 96–98, 201, 202; 455/3.1, 3.2, 4.2, 12.1

[56] References Cited

FOREIGN PATENT DOCUMENTS 0523629   1/1993   European Pat. Off. .
0563937  10/1993   European Pat. Off. .

OTHER PUBLICATIONS

Frame–Synchronous Control and Indication Signals for Audiovisual Systems, Geneva 1990 Recommendation H.230, revised Mar. 1993, pp. 1–7.
European Conference on Satellite Communications, 2 Nov. 1993 –4 Nov. 1993, pp. 175–186, Barbieri et al.
Phoenix Conference on Computers and Communications–Proceedings, 21 Mar. 1990–23 Mar. 1990, pp. 386–393, Watabe et al.

*Primary Examiner*—Wing F. Chan
*Attorney, Agent, or Firm*—Herbert Dubno

[57] ABSTRACT

The peripheral unit for multi-videoconferencing permits multi-videoconferencing while fully exploiting the characteristics of a telecommunications satellite, and can also provide the service to users not connected to the ground network. In particular, the system can connect several remote rooms through a satellite network, interfaceable with a ground control center, to provide an overall mixed ground-satellite network able to simultaneously serve both permanent and temporary users. The peripheral unit is connected on one side to the transceiving station for the satellite link and on the other to the encoder and decoder of video and audio signals, which are generated locally or received from a remote station and organized according to a protocol provided with time-slot frames and superframes.

5 Claims, 4 Drawing Sheets

PERIPHERAL UNIT FOR SATELITE MULTI-VIDEOCONFERENCING

FIELD OF THE INVENTION

The present invention relates to telecommunications systems for video, audio, and data information and, more particularly to a peripheral unit for satellite multi-videoconferencing.

BACKGROUND OF THE INVENTION

Multi-videoconferencing is a service that permits to connection of three or more conference rooms, allowing a video, voice and data connection between all those participating in the session present in the rooms. Working groups belonging to several offices, physically separated even by great distances, can thus conduct technical meetings with no need to go on expensive trips.

The service is offered by using the rooms and the equipment previously designed for point-to-point videoconferencing, in which only two rooms are connected with each other so that the corresponding room is seen, thus simulating what occurs in a meeting between two groups seated at opposite sides of a table.

Typically, rooms are equipped with a meeting table, on one side of which are seated local participants, who come in contact with the participants present in the remote room by receiving their images through monitors present on the other side of the table. The room equipment is thus designed to collect video, voice and data information generated locally, and, through CODEC, to encode them so as to conveniently transmit them to the room where they are decoded and displayed in real time.

In multi-videoconferencing, on the other hand, each room is in contact with two or more other rooms. To provide a service identical to point-to-point videoconferencing, it would be necessary to connect all the rooms in a complete network and simultaneously display in each room what has been produced by all the others. Room equipment is generally not dimensioned to do this, both in terms of visual displays and in terms of decoding equipment, as both can normally process the flow coming from just a single connection. In any case, even if it were possible, the resulting performance would risk becoming irksome with the increase in number of rooms simultaneously connected.

SUMMARY OF THE INVENTION

To obviate these problems, the multi-videoconferencing service is realized by collecting in real time the video coming from each room and sending, to each room, only the image it is interested in. The adopted strategy for selecting the image of interest is as follows:

all rooms are sent the image coming from the room where the current speaker is present, on the assumption that in any meeting speakers alternate, taking the floor one at a time, and at each moment everyone's attention is focussed on whoever is speaking;

the current speaker's room is sent video coming from the room where the first person to speak before him is present, assuming that in general the current speaker takes the floor after an invitation by the previous speaker and therefore his intervention is aimed mostly at the latter.

Obviously, in the course of the meeting the speakers' role evolves, so the network performing the routing just described must reconfigure itself dynamically, following the status of the meeting in real time.

Several different strategies to determine the current speaker exist:

1—Automatic on the vocal level. The vocal level coming from each room is continuously monitored, and the floor is given to the room from which the strongest signal comes.

This is the most natural way of managing multi-videoconferencing. In each room, when someone has something to say, he starts to speak and everyone's attention is automatically concentrated on him. It may, however, cause some problems. For example, there could be undesired switchings due to accidental or background noise, especially when the number of interconnected rooms is high, or when participants lack discipline or simply are not used to this communication system.

2—Driven by a director. One of the participants in the multi-video-conference assumes the role of director and gives the floor to whoever requests it through a device present in each room.

It is the most orderly way to manage a multi-video-conference and is very well suited to meetings in which many rooms participate, simulating what occurs at a meeting in which speakers alternate at the chairman's invitation, and the latter takes into account everyone's desire to speak. It may seem overly complicated when the number of rooms is limited.

3—Forced by the director. The director has a list of intervention and gives the floor according to the agenda for the meeting or other criteria decided by him. This choice strategy may be seen as a simplification of the previous one and adopted for example when the director does not have, because the system does not provide it to him, the status of the requests for the floor of the various rooms.

4—Forced upon request. The request for the floor coming from each room is monitored, and the floor is given automatically to whoever requests it, immediately after the request itself.

It is a solution lying halfway between 1 and 2; from these it inherits part of the pros and cons.

Each of the techniques illustrated may turn out to be more or less advantageous depending, for instance, on the purposes of the meeting and on the users' familiarity with use of this video-communication system.

Commercial units for the management of the multi-video-conference very often allow a choice between strategies 1 and 2.

There are some videoconferencing rooms currently operational that may be interconnected both in a point-to-point configuration and in multi-videoconferencing through the long-distance digital network realized over ground carriers.

In the multi-videoconferencing mode, the rooms involved are connected in a star configuration to a national center, where there is a control unit that carries out the dynamic routing operations required throughout the network.

In the case of multi-videoconferencing sessions involving international routes, a satellite link is already used to interconnect the national control unit with the one co-located with the manager of the network to which the rooms to be reached are connected.

Videoconferencing rooms may be permanently installed at private user's or at the public manager's locations, and the latter may also offer a temporary installation where there is no actual need justifying setting up a permanent room and when the customer, for the sake of logistics, of his image, or for other reasons, is not willing to use a public room.

In this case, the manager offers to temporarily set up the room at the customer's site, utilizing a transportable module which includes all necessary audio and video equipment, as well as signal encoding and decoding equipment.

For a temporary service it is often not economical to reach the customer's site with a ground link allowing access to the digital network. In this case, a satellite link, attained through transportable stations allocated for the occasion to the temporary room, is usually employed.

If a point-to-point video-conference has to be conducted, then the transportable stations are linked directly to the two rooms involved and the connection takes place via satellite. Similarly, if a multi-video-conference where only one temporary room is present has to be performed, then this latter is linked via satellite to the control center, to which are connected the other rooms through a ground network.

On the other hand, it is not currently possible to offer the multi-videoconferencing service conveniently if two or more rooms, among those involved in the same session, cannot be reached through the ground network.

This is because the multi-videoconferencing service through the ground network is provided using a control unit to which all rooms are connected in a star configuration, where the control unit is the center of the star.

The control unit receives the information flow, typically at the bit rate of 2 Mbit/s, coming from each room and decodes it extracting the video, audio, data, and signalling components, then it reconstructs the flows to send to each room. In particular, the video and data selected are organized according to one of the previously described techniques, while the voice signal, in order not to introduce any echos, is the signal obtained from the sum of all those coming from all the other rooms. This technique allows each room to have the feeling of what is occurring in all the others, though they are not visible.

To conduct a multi-video-conference via satellite it is not possible to utilize the same network structure: although it is possible in principle to link all rooms via satellite with bi-directional 2 Mbit/s channels to the control unit, this type of link introduces two severe drawbacks:

the signal coming from the current speaker's room transits through the satellite, reaches the control unit, and from this it is once again sent to the other rooms through another satellite link. This involves a double jump which introduces an unacceptable delay on the signal, violating CCITT Recommendations regarding the admissible delay for interactive video and voice services;

a number of couples of 2 Mbit/s channels equal to the number of connected rooms simultaneously transits through the satellite. This entails a large waste of resources, since as seen previously, at any time only two links are actually utilized, ie the one for the current speaker and the one for the previous speaker.

To obviate these problems, in the multi-videoconferencing system of the present invention, only the signals coming from the current speaker's and the previous speaker's rooms are sent to the satellite at each point in time. By exploiting the satellite's intrinsic broadcasting capability, these signals can thus be received by all rooms, which therefore have to locally choose their appropriate channel as a function of their status within the network.

As is evident, in this way both of the aforementioned problems are solved. The signal reaches its destination after a single transit through the satellite and at any given time only 2 video channels are occupied, regardless of the number of rooms taking part in the same multi-video-conference, allowing a remarkable bandwidth saving. Actually, to manage the system and transmit all audio signals independently of active video signals, for each room a 64 Kbit/s bi-directional channel is utilized in addition to the two video channels.

Overall, the system comprises a number of peripheral multi-videoconferencing units equal to the number of interconnected rooms, and a director's unit. The peripheral units, object of the present invention, are tasked with interfacing room CODECs with the satellite network, while the director's unit controls and manages the network, which is thus dynamically reconfigured in real time. The peripheral units are connected in a star configuration to the director's unit by means of the same number of 64 Kbit/s bi-directional channels which, as previously stated, carry the network signalling and the audio from the rooms.

The peripheral unit for satellite multi-videoconferencing, according to the present invention, supports a multi-videoconferencing system that, by fully exploiting the features of the satellite medium, can be used to provide the service even to users that are not linked to the ground network. In particular, the system allows a connection between several remote rooms through a satellite network, interfaceable with a ground control center, to provided an overall mixed ground-satellite network that is capable of simultaneously serving both permanent and temporary users, extending the potential number of customers.

The invention thus comprises a peripheral unit for satellite multi-videoconferencing connected to a transceiving station for satellite link and to an encoder and decoder of video and audio signals, generated locally or received from a remote station and organized according to a protocol provided with frames and superframes of time slots. The unit comprises a part for processing data coming from said station and directed toward the encoder and decoder composed of:

a first interface which transforms the balanced signals coming from the station into unbalanced ones toward the unit and, vice versa, the unbalanced signals coming from the unit into balanced ones toward the station;

a second and a third interface, comprising first, second and third receiving sections, which extract from the single input signal the data, the clock signal, and the frame synchronism, and first, second, and third transmitting sections, which receive separate data and clock signal and encode them into a single signal inserting frame synchronism information;

a multiplexer to select one of the two flows provided by the first and second receiving section, coming from the station;

a first block, to align the frame of the flow received from said multiplexer to the internal timing;

a second block, to introduce controlled delays on signals present in a first and a second group of time slots of the flow provided by the first block;

a third block, comprising a first and a second reception block and a transmission block, for managing room audio and signalling information between the image encoding and decoding systems, which it extracts respectively from the flows provided by the first interface and by the second block;

a fourth block, to perform multiframe alignment of the signal that it receives from the second block and sends towards the encoder and decoder through the third transmitting section;

a microprocessor, to realize the peripheral control of the unit through the third block; and a fifth block, to generate the frame synchronism time slot, inserted by the third transmitting section.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
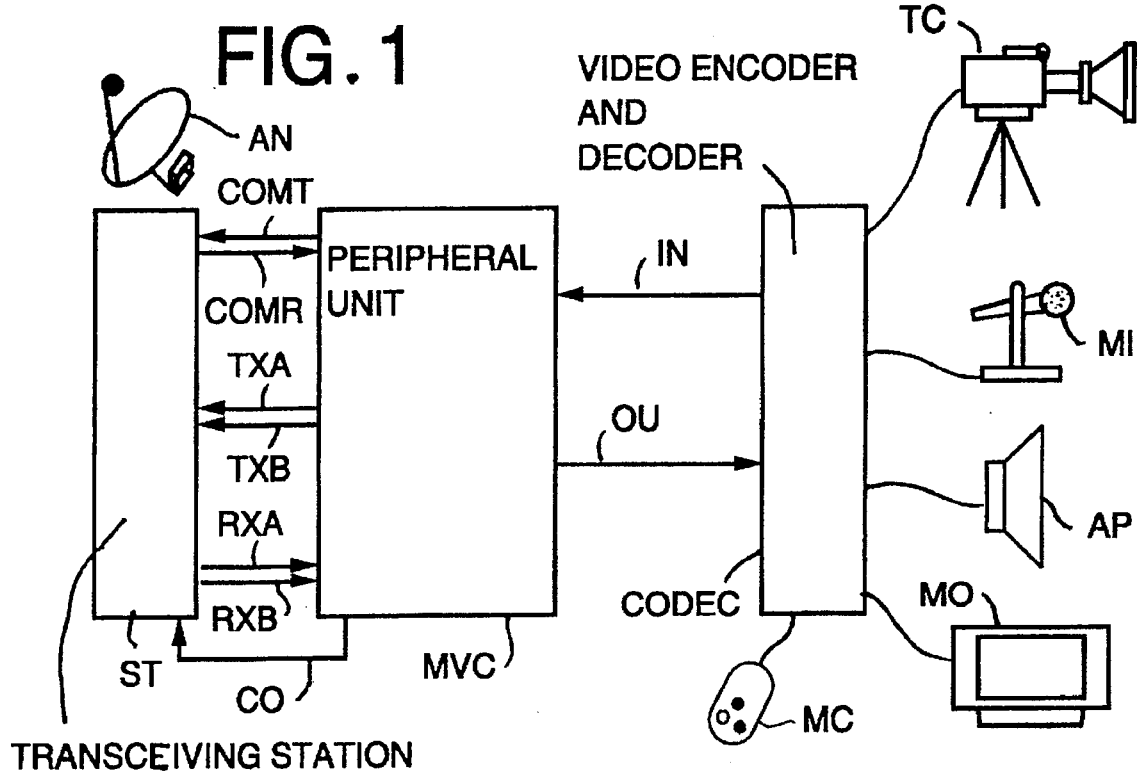
FIG. 1 is a schematic view of a peripheral installation for satellite multi-videoconferencing.

A peripheral installation for satellite multi-videoconferencing is shown in FIG. 1. It is composed of a peripheral unit MVC, a video encoder and decoder CODEC, one or more video cameras TC, one or more monitors MO, microphones MI, speakers AP, a command mini-console MC and a portable transceiving station ST, provided with antenna AN, for the satellite link.

The portable station is connected to peripheral unit MVC by means of two 2 Mbit/s bi-directional links TXA, RXA and TXB, RXB relevant to the video and audio signals of the current speaker and of the previous speaker, and by means of a 64 Kbit/s bi-directional link COMT, COMP, relevant to the signalling and to a service audio signal. Moreover, there is also a wire CO for controlling the switching between the signal relevant to the current speaker and the one relevant to the previous speaker and the activation of the transmission by station ST.

The peripheral unit is connected to the video CODEC through the opposite direction links IN and OU. The 2 Mbit/s flows transiting over these links are structured in accordance with network standard G704, and a carry signal that is in accordance with standard CCITT H221.

Peripheral unit MVC carries out the following tasks:

routing to the satellite the 2 Mbit/s flow coming from the CODEC over channel TXA or TXB, according to the indication of the director's unit;

extracting from the 2 Mbit/s flow, coming from the CODEC over the link IN, the 64 Kbit/s flow present in time slot 1 and relevant to the I-Channel of protocol H221, and sending this to the director's unit by means of link COMT;

selecting the 2 Mbit/s flow RXA or RXB, coming respectively from the current speaker or the previous speaker, to be sent to the CODEC through the link OU, upon indication of the director's unit;

maintaining alignment of frame and multi-frame H221 on the flow sent to the CODEC, even in the absence of incoming flow or after switching of the flow source;

inserting, into the flow toward the CODEC, the signalling prescribed by recommendation H230 for management of the multi-videoconferencing;

managing local switchings, upon selection by the operator, without slaving to the director's unit during the network preparation phase; and managing the service audio channel, which links operators located at the peripheral rooms with the operator in the director's station, through links COMT and COMR, utilizing the band not occupied by the signalling.

Figure 2:
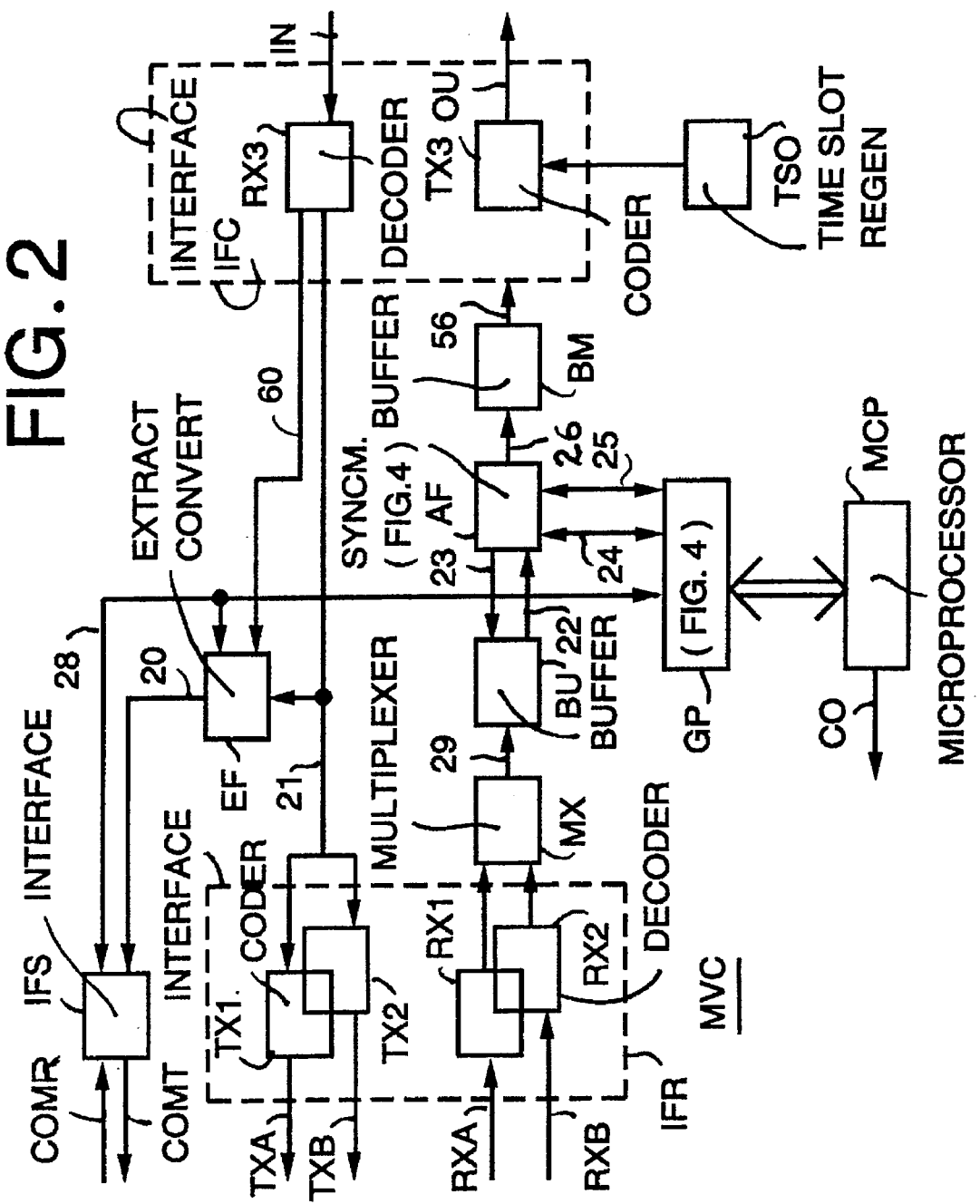
FIG. 2 is a block diagram of the peripheral unit, denoted by MVC in FIG. 1.

The block diagram of peripheral unit MVC is shown in FIG. 2.

Unit MVC is subdivided into two logically separated and time-independent parts, one utilized to process data coming from the portable station and directed toward the CODEC and the other one utilized for the opposite path, i.e. from the CODEC to the portable station.

These two sections perform, autonomously from each other, data processing operations that are quite separate and dissimilar even in terms of complexity.

MVC interacts with the outside by means of appropriate interfaces IFC, IFR, and IFS. Interfaces IFC and IFR comprise sections RX1, 2, 3 and TX1, 2, 3 that are in accordance with standard G704.

Sections TX1, 2, 3 receive separate data and clock signal and codify them so as to allow their transmission over a single wire at the bit rate of 2 Mbit/s, inserting frame synchronism information, allocated in time slot 0.

Sections RX1, 2, 3 perform the opposite operation, which consists of extracting from the single input signal the data, the 2 MHz clock signal and the frame synchronism with a period of 125µs.

Interface IFS realizes the RS 422 standard, transforming the data and the clock signal from balanced to unbalanced and viceversa.

The data flow coming in from the video CODEC is made available over connection 21 by interface IFC, while the frame synchronism with a period of 125µs is provided over wire 60. Block EF extracts from the data flow the flow present in time slot 1, converts it to a bit rate of 64 Kbit/s and re-transmits it by means of connection 20 to interface IFS. This latter transforms it in accordance with standard RS422 and sends it through connection COMT to a transmission modem contained in the portable station. EF, moreover, inserts and extracts the service audio signal exchanged between local operator and direction operator.

The equivalent 64 Kbit/s channel, coming from the station over connection COMR, is passed through the same interface IFS to a block GP by means of connection 28.

The entire data flow is also transferred to the two sections TX1 and TX2 of interface IFR to construct the two carriers TXA and TXB.

The functions performed by MVC on the data flow with opposite transmission direction are much more complex.

The 2 Mbit/s flows RXA and RXB, coming from the portable station, after having been processed by receiving sections RX1 and RX2 of interface IFR, arrive at the input side of a multiplexer MX which select one of the two flows to send over connection 29 toward subsequent block BU. This latter block consists of a buffer for the alignment of the G704 frame. As the flow selected by the multiplexer has a timing associated with the source, in order to be manipulated by the logic contained in subsequent blocks it must be synchronized with the internal timing of the latter, provided though wire 22 by a block AF.

Block BU performs this function guaranteeing the same timing of the outgoing flow even when passing between one source and another one.

The data in output from BU over connection 23 then transit through aforesaid block AF. This latter has the task of manipulating and structuring information useful to block GP, able to manage protocol H221, with which it is interconnected by means of bi-directional connections 24 and 25.

Finally, the processed data flow is sent through connection 26 to a further functional block, denominated BM, consisting essentially of a buffer, whose task is to perform the alignment of the multi-frame before sending it over wire 56 to section TX3 of interface IFC toward the video CODEC.

This latter buffer prevents the discontinuity of protocol H221 toward the CODEC, which occurs when MX executes a switching between different data sources, generally not synchronized with each other either at frame or at multi-frame level. Possible phase displacements are recovered in output by buffer BM with the joint help of a microprocessor MCP, able to realize peripheral control through connection 19.

In order to guarantee CODEC synchronization, regardless of whether flows coming from the portable station are present or not, or are affected by error, time slot 0 is regenerated by a block TSO and inserted into the frame by section TX3 of interface IFC.

Figure 3:
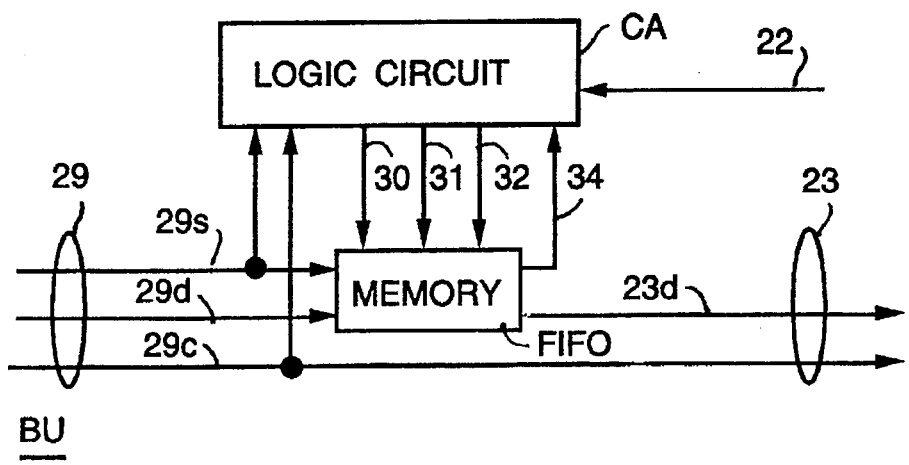
FIG. 3 is a block diagram of the block denoted by BU in FIG. 2.

Block BU is represented in further detail in the block diagram of FIG. 3.

The serial data, the frame synchronism signal and the clock signal arrive through connection 29 utilizing respectively wires 29d, 29s and 29c. The alignment function between incoming data and the local frame synchronism, coming from block AF through wire 22, is realized by means of a logic circuit CA and of a First-In First-Out memory FIFO, in which the serial data and separately the relative frame synchronism signal, time associated to the data, are inscribed.

Logic circuit CA, providing all command signals to the FIFO, is able to perform the following logic operations:

initial synchronization between input and output data;
periodic verification of how alignment is maintained;
check of out-of-alignment conditions; and
data re-synchronization.

These operations set up an appropriate length of memory FIFO which corresponds to setting up an appropriate delay on output data over wire 23d. This allows compensate for the time difference existing between the frame synchronism of the input data and the local synchronism generated by block AF.

The procedure carried out by logic circuit CA is the following.

It starts from the initialization condition, proceeding to disable the writing and reading signals and subsequently to reset the FIFO, utilizing respectively wires 30, 31 and 32. This last signal empties the memory, i.e. it forces the internal writing and reading pointers into the overlapping condition.

Subsequently, circuit CA reams waiting for the arrival, over wire 29s, of the synchronism signal; when this latter appears, FIFO writing is enabled.

This operation guarantees that the first cell of the FIFO will contain the first bit of data of the frame and the relevant associated synchronism.

The procedure remains waiting for the local frame synchronism signal over wire 22, while the memory continues its data memorization phase. When the local synchronism signal appears, CA enables FIFO reading, thus realizing the desired alignment between data read and local synchronism.

The subsequent phases of the procedure are part of the check that the alignment has occurred and thus also recognizes any out-of-alignment condition caused normally by microprocessor MCP (FIG. 2) during switching from one data source to the other with the selection command of multiplexer MX (FIG. 2).

The alignment check is structured into two steps. The first is to wait for the local synchronism signal, while the second is to verify that simultaneously with this latter, the synchronism associated with data read by the FIFO through connection 34 is also present.

If the check yields a positive result, it is repeated at each local synchronism period; when instead the result turns out to be negative, the alignment procedure starts over from the initialization state.

A logic circuit able to execute this procedure can easily be realized utilizing programmable logic components.

Figure 4:
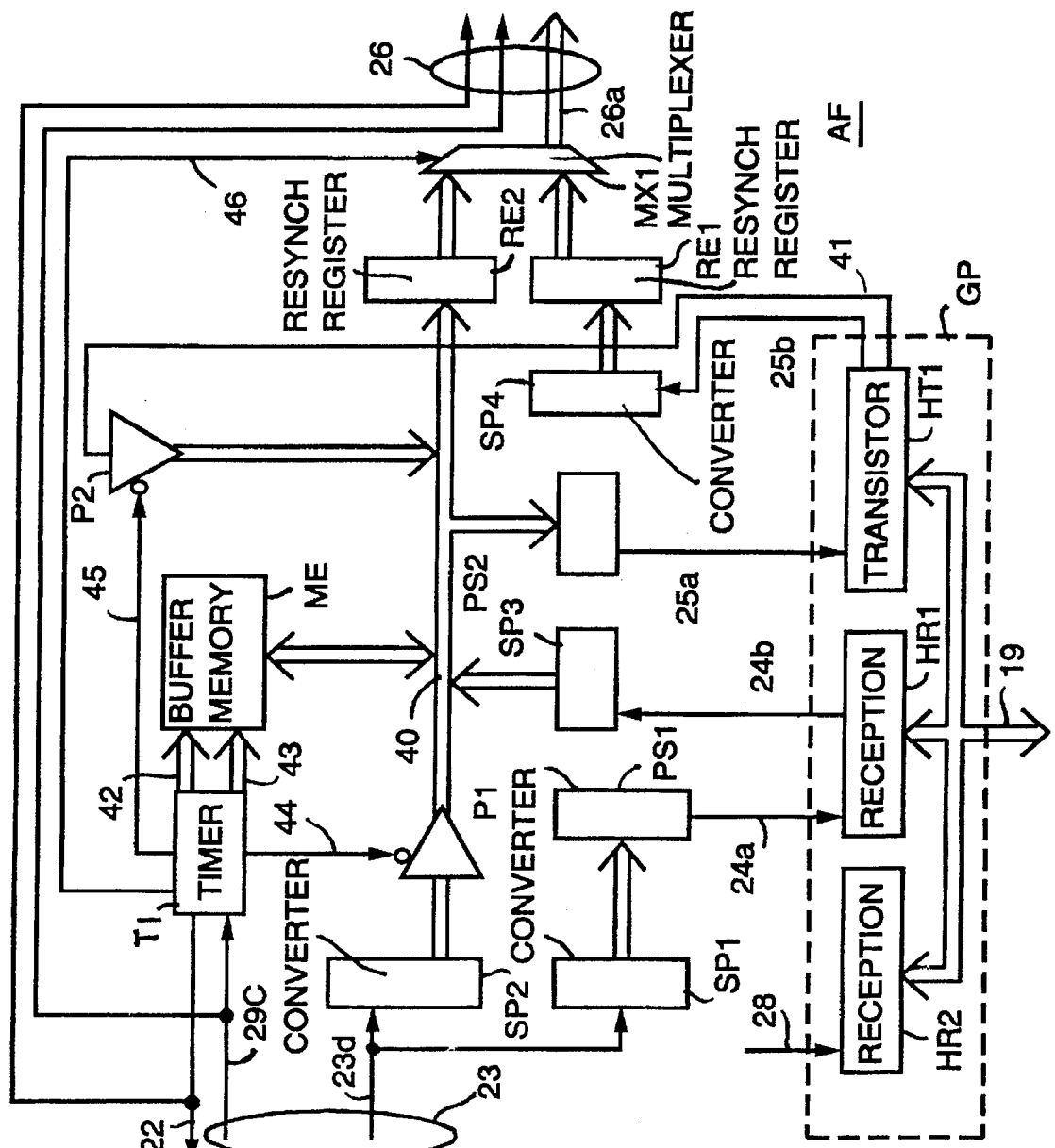
FIG. 4 is a block diagram of the blocks denoted by AF and GP in FIG. 2.

Subsequent blocks AF and GP have been represented in the block diagram in FIG. 4.

The flow of 2 Mbit/s serial data, present at the input over wire 23d, is split into two flows, sending them simultaneously to two series-to-parallel converters SP1 and SP2, which extract the serial flows respectively from time slot 1 and from time slots 2, . . . , 31 and provide them to their outputs with 8 bit parallelism.

The parallel flow in output from SP1 is transferred to a parallel-to-series converter PS1 to be convened into a serial flow at the bit rate of 64 Kbit/s, which is then made available over wire 24a, headed for block GP.

This last block is composed of three blocks, dedicated to processing the protocol H221, in particular a transmission block HT1 and two reception blocks HR1 and HR2. Integrated components including both the receiving part and the transmitting part of the H221 protocol manager are well known: an example is the one described in U.S. Pat. No. 5,197,083.

Block HR2 extracts from the 64 kbit/s flow, which it receives over wire 28 from interface IFS (FIG. 2), information relevant to the management of the multi-videoconferencing network coming in from the centralized direction.

Block HR1 extracts from the 64 kbit/s flow information relevant to the H221 protocol, in particular signalling information between the systems for encoding and decoding the room's image and the audio signal.

To do that, HR1 simultaneously loads time slot 1 of the nth frame and gives back at the output, over connection 24b, time slot 1 of the n-1st frame, which is in turn transferred into a series-to-parallel converter SP3 to be memorized into a delay buffer memory ME. This memory, of 8 kbyte capacity, is capable of memorizing 164 G704 frames and can be reached through connection 40. Signalling information is made available through connection 19 to microprocessor MCP (FIG. 2), which sends the required commands to the local CODEC.

After a permanence equal to 158 frame intervals in memory ME, the sample of time slot 1 is read and, through connection 40, sent to a parallel-to-series converter PS2 to be convened into a serial flow at a bit rate of 64 Kbit/s, which is then made available over wire 25a, headed for block GP. The serial flow transits through transmitting part HT1 of the manager of the H221 protocol and, at the subsequent frame, is sent by means of wire 25b to a series-to-parallel converter SP4.

The overall delay that a sample of time slot 1 undergoes from the time it is emitted by HR1 and the time it is received by HT1 is equal to 160 frames (1 in SP3, 158 in ME and 1 in PS2). Such delay is necessary to allow the extraction of a complete message by HR1, send it to the microprocessor through connection 19, so that the latter can process it and obtain the appropriate command to send to HT1. Transiting through GP, the message brought by the serial flow must be suitably modified by the microprocessor.

A further task of block HT1 is to insert 11221 frame synchronisms under microprocessor MCP control (FIG. 2), so as to guarantee protocol continuity even in the absence of a valid input signal.

The other flow with 8 bit parallelism, provided by SP2, is transferred from port P1 in the intervals assigned to time slots 2, ..., 31 over connection 40 to be memorized in memory ME. Each sample belonging to time slots 2, ..., 31 is read 164 flames after being written, whilst, as previously seen, the sample belonging to time slot 1 is delayed by 158 flames in ME. However, if the one-frame delays undergone in blocks PS1, HR1, SP3, PS2, HT1, and SP4 are added, the sample belonging to time slot 1, too, undergoes an overall delay of 164 frames.

The transmitting part HT1 of the H221 protocol manager also provides over wire 41 an H221 frame-start synchronism signal, which will be inserted from port P2 over connection 40 in correspondence with time slot 0, which is free, as the frame synchronism information had already been used by the previous block BU (FIG. 2). Over connection 40 thus are present samples relevant to time slots 0, 2, ..., 31.

By means of two re-synchronization registers RE2 and RE1, operating respectively on flows belonging to time slots 0, 2, ..., 31 and to time slot 1, the samples are realigned and recombined with each other by a multiplexer MX1 so as to obtain a single 8 bit parallel flow at 2 Mbit/s over connection 26a.

The whole circuit is timed by block TI, which, on the basis of the clock signal present over wire 29c, generates the reading and writing addresses, made up of a common 5 bit part, present over connection 42, which represents the channel number, and of two 8 bit parts with 158 or 164 module, present alternately over connection 43, which are utilized in correspondence with time slot 1 or time slots 2, ..., 31.

The writing and reading cycles are organized, with respect to the time of stability of the addresses, in the following way: the reading cycle precedes the writing cycle of the same cell, where a sample of the channel is memorized, to guarantee an input-output delay equal to 164 frames.

The TI block futhermore generates: over wire 44, an active signal in correspondence with time slots 2, ..., 31; over wire 45, an active signal in correspondence with time slots 0; over wire 46, an active signal in correspondence with time slots 1; and over wire 22 frame timing signal, used also by block BU (FIG. 3), already described.

Figure 5:
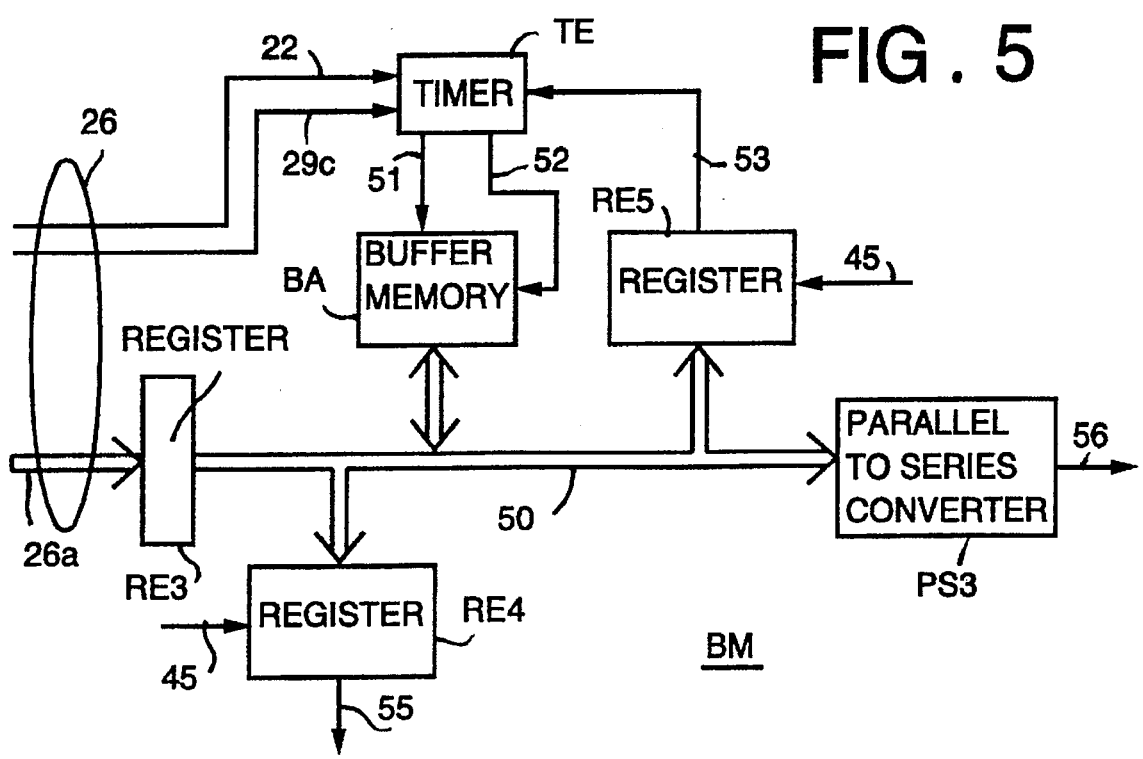
FIG. 5 is a block diagram of the block denoted by BM in FIG. 2.

Functional block BM, whose task is to perform the multi-frame alignment, is represented in detail in FIG. 5.

Since data flows coming from the portable station are, from the point of view of the protocol, mutally uncorrelated, during the transient due to the switching the new flow presented at the input of block BM is not synchronized with the previous one.

Block BM, with the help of microprocessor MCP (FIG. 2), guarantees the continuity of the protocol at multi-frame level during switching operations between the 2 Mbit/s flows coming from the portable station.

For that purpose, a buffer memory BA is envisaged, with a capacity of 8 kbyte, able to memorize two H221 frames, or 160 G704 frames from the 2 Mbit/s flow coming in over connection 26a. A register RE3, operating at time slot time, temporarily memorizes the samples of each channel in order to make them stable with respect to the functioning timing of block BM and presents them at the output over connection 50, linked to the input/output port of memory BA.

A timing block TE generates the writing and reading addresses for memory BA. These addresses are composed of a common 5 bit part, present over connection 51, which represents the channel number and is synchronized by the frame synchronism signal coming from block AF (FIG. 4) over wire 22, and by two 8 bit parts with module 160, alternately present over connection 52, which are utilized in reading and writing.

The read frame address scans the memory in a cyclical way with no external synchronization while the written frame address is synchronized by a signal extracted from the 2 Mbit/s flow during time slot 0 by a register RE5 and provided over connection 53. This signal, as previously stated, is provided by block GP (FIG. 4) during frame 0 of protocol H221 and its function is to guarantee that the protocol itself is memorized starting from the beginning of the buffer memory.

The extraction of this signal is performed by means of register RE5, enabled by the signal active in correspondence with time slot 0, provided over wire 45 by block TI (FIG. 4).

The protocol synchronism, being written in memory as well can in turn be extracted after the delay introduced by buffer memory BA and sent through register RE4 and wire 55 to the microprocessor for the control functions. Register RE4 is enabled over wire 45 by the signal active in correspondence with time slot 0.

Finally, data over connection 50 are converted into a fully serial 2 Mbit/s flow by parallel-to-series converter PS3 and made available over wire 56.

Figure 6:
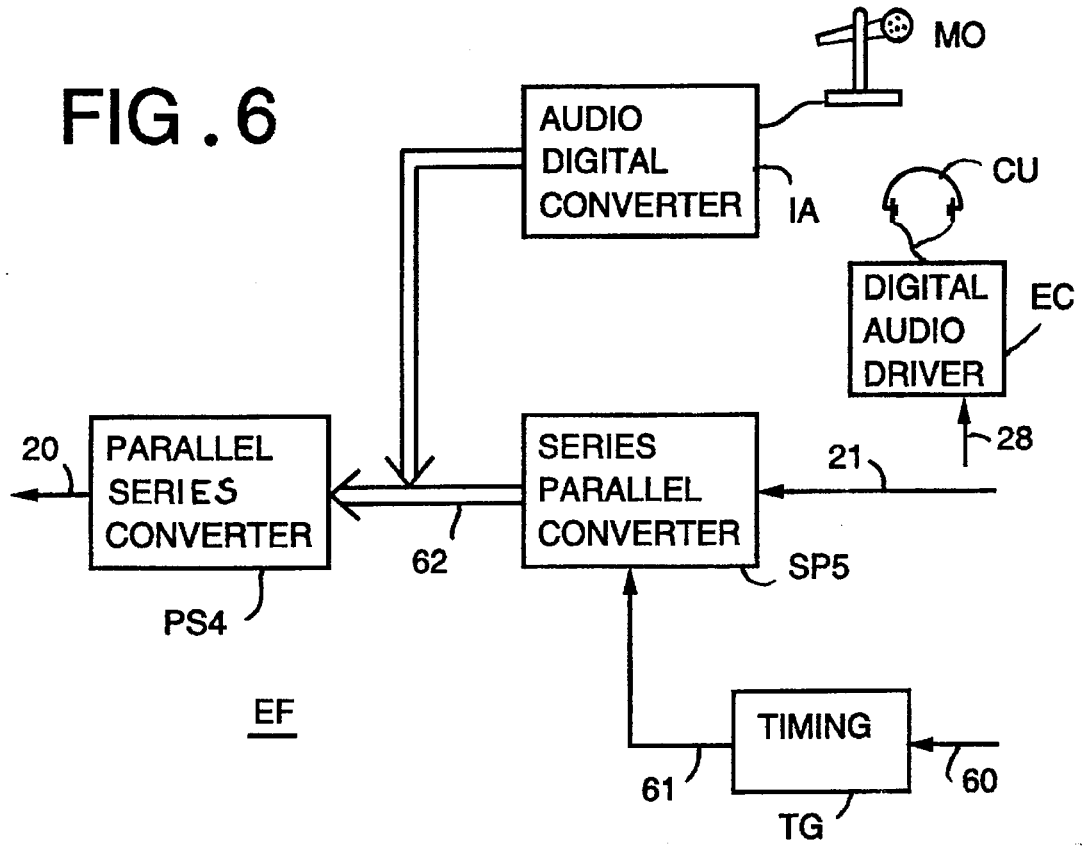
FIG. 6 is a block diagram of the block denoted by EF in FIG. 2.

The block diagram in FIG. 6 represents block EF, which extracts, from the data flow coming in from the video CODEC, the data flow transported in time slot 1 and transforms it into a 64 Kbk flow to be sent to the modem of the portable station for use by the direction centre to control the system.

A series-to-parallel converter SPS, enabled by the signal over wire 61, extracts the content of time slot 1 from the 2 Mbit/s flow over wire 21, making it available in parallel form over connection 62. Through this latter connection the service audio signal, transmitted by the local operator toward the director's post, is also inserted. The audio signal, collected by microphone MO, is convened into a digital signal by block IA and placed over connection 62.

A subsequent parallel-to-series converter PS4 converts the parallel flow into a serial flow at the bitrate of 64 Kbit/s, which is then sent to interface IFS (FIG. 2) through wire 20. The signal over wire 61 is an active signal in correspondence with time slot 1 and it is generated by a timing block TG, which, utilizing a counter and a decoder, identifies the time allocation of time slot 1 within the serial flow. Block TG receives the frame synchronism with a period of 125 µs over wire 60 from interface IFC (FIG. 2).

Block EC receives from wire 28 the digital audio signal coming from the direction operator and converts it so as to drive an acoustic headset CU for the local operator.

The MCP block, represented in FIG. 2, is, as previously stated, a microprocessor suitably programmed to perform the following tasks:

controlling access to the satellite by the peripheral unit through command line CO as a function of commands received by the direction and/or the local operator;

selecting through block MX the channel to send to the local CODEC as a function of the commands received from the direction and/or the local operator;

controlling blocks BU, HT1 (FIG. 4) and BM so as to guarantee the continuity of the synchronization channel H221 in the 2 Mbit/s output flow, even in the presence of discontinuities of the input flow, due both to source variation and to a temporary loss of the satellite link; and generating H221 commands to insert through the HT1 block into the 2 Mbit/s output flow.

It is evident that what has just been described has been provided solely by way of non-limiting example. Variations and modifications are possible without departing from the scope of protection of the claims.

We claim:

1. Peripheral unit for satellite multi-videoconferencing connected to a transceiving station for satellite link and to an encoder and decoder of video and audio signals, generated locally or received from a remote location and organized according to a protocol provided with frames and superframes of time slots, said peripheral unit comprising a part for processing data coming from said station and directed toward the encoder and decoder composed of:

a first interface (IFS) which transforms balanced signals coming from the station into unbalanced signals toward the unit and conversely unbalanced signals coming from the unit into balanced signals toward the station;

a second and a third interface, comprising first, second and third receiving sections, which extract from each single input signal respective data, a respective clock signal, and a respective frame synchronism, and first, second, and third transmitting sections (TX1, TX2, TX3), which receive separate data and clock signal and encode them into a single signal inserting frame synchronism information;

a multiplexer to select one of the two flows provided by the first and second receiving section, coming from the station;

a first block to align a frame of a flow received from said multiplexer to an internal timing;

a second block to introduce controlled delays on signals present in a first and a second group of time slots of a flow provided by the first block;

a third block comprising a first and a second reception block and a transmission block for managing room audio and signalling information between the image encoding and decoding systems, which it extracts respectively from flows provided by the first interface and by the second block;

a fourth block to perform multiframe alignment of a signal that it receives from the second block and sends towards the encoder and decoder through said third transmitting section;

a microprocessor for peripheral control of the unit through said third block; and a fifth block to generate a frame synchronism time slot inserted by said third transmitting section said peripheral unit further comprising a part for processing data coming from the encoder and decoder and headed for said station, composed of:

a sixth block to extract data present in a time slot of the flow provided by the third receiving station of the third interface, convert it to a suitable bitrate and re-transmit it through said first interface.

2. The peripheral unit for satellite multi-videoconferencing defined in claim 1 wherein said first block comprises:

a logic circuit for synchronizing data with the local frame synchronism signal, for periodic verification and for alignment checking; and a First-in First out memory for temporary storage of serial data and of the related frame synchronism signal coming from said multiplexer, operated by writing, reading and reset signals provided by said logic circuit.

3. The peripheral unit for satellite multi-video conferencing as defined in claim 1 wherein said second block comprises:

a first and a second series-to-parallel converter to extract the first and second group of time slots from the flow provided by the first block;

a first parallel-to-series converter to convert a parallel flow provided by the first series-to-parallel converter into a serial flow directed toward a first reception block of said third block;

a third series-to-parallel converter, to convert a flow coming from the first reception block and transfer it over a first connection;

a first buffer memory to memorize a certain number of frames of the signal present over the first connection;

a seventh block to generate reading and writing addresses for the first buffer memory, signals active in correspondence with different time slots and a frame timing signal;

a first gate, to transfer over the first connection a flow provided by the second series-to-parallel converter on the basis of a signal provided by the seventh block;

a second parallel-to-series converter, to convert a parallel flow present over the first connection into a serial flow headed for a transmission block of said third block;

a fourth series-to-parallel converter which converts the flow coming from the transmission block;

a first and a second re-synchronization register operating respectively on a flow provided by the fourth series-to-parallel converter and on a flow present over the first connection;

a second gate to insert a frame-start synchronism signal coming from the transmission block into the flow present over the first connection; and a multiplexer to combine flows provided by the re-synchronization registers, with each other.

4. The peripheral unit for satellite multi-videoconferencing defined in claim 1 wherein said fourth block comprises:

a third register to temporarily memorize the flow coming from said second block and provide it over a second connection;

a second buffer memory to memorize a certain number of frames of the flow present over the second connection;

an eighth block, to generate reading and writing addresses for the second buffer memory;

a fourth and a fifth register to extract from the flow over the second connection respective protocol synchronisms and to send them to the microprocessor and to the eighth block; and a third parallel-to-series converter, to convert the parallel flow present over the second connection into a serial output flow.

5. The peripheral unit for satellite multi-videoconferencing defined in claim 1, wherein said sixth block comprises:

a fifth series-to-parallel converter to extract one time slot from the flow provided by the third receiving section of the third interface and convert it into parallel format;

a fourth parallel-to-series converter to convert the parallel flow provided by the fifth series-to-parallel converter into a serial output flow;

a ninth block to generate an enabling signal for the fifth series-to-parallel converter;

a tenth block to convert into digital format the audio signal generated by a local operator; and an eleventh block to convert into analog format said audio signal generated by a remote operator.

* * * * *